June 1, 1965 F. B. BARTER ETAL 3,187,332

PRESSURE-SENSITIVE SCRIBER

Filed Feb. 6, 1963

INVENTORS
Francis B. Barter
Nicholas I. DeMeo
by Roberts, Cushman & Grover
ATT'YS

United States Patent Office 3,187,332
Patented June 1, 1965

3,187,332

PRESSURE-SENSITIVE SCRIBER

Francis B. Barter, Westwood, and Nicholas L. De Meo, Woburn, Mass., assignors to United Electric Controls Company, Watertown, Mass., a corporation of Massachusetts Filed Feb. 6, 1963, Ser. No. 256,743
8 Claims. (Cl. 346—139)

This invention relates to indicating and recording instruments such as illustrated in the copending application of Henry G. Leupold, Serial No. 19,714, filed April 4, 1960, now Patent No. 3,144,771, wherein a pen arm is supported at one end on a shaft perpendicular to the plane of a chart for movement of the arm parallel to the chart. In the aforesaid application the pen arm is provided with a nib at its distal end to which ink is supplied for drawing a line on the chart. As herein illustrated the pen arm is provided with a stylus designed to draw a line on a chart by pressure of the stylus against the chart in place of a fluid-supplied nib, for use where vibrations and/or extreme variations in ambient temperature make the use of a fluid impractical, and the invention has for its principal objects to provide an improved mounting for the pen arm and stylus to enable adjusting the perpendicular pressure of the stylus against the chart and to support the pen arm for adjustment parallel to the chart to establish a true zero position.

In accordance with the invention, the scriber comprises a rigid pen arm, a stylus, a flexible element yieldably supporting the stylus at one end of the arm, means supporting the arm adjacent the other end for pivotal movement relative to an axis parallel to the chart, means yieldably opposing movement of the arm relative to said parallel axis up to a predetermined maximum, and adjustable means on the arm operative, by engagement with the flexible element, to depress the stylus relative to the arm sufficiently to increase the pressure of the stylus on the chart from a predetermined minimum to said predetermined maximum. The means supporting the arm comprises a block containing a hole for receiving a shaft, first pivot means securing the arm to the block for pivotal movement relative to a transverse axis parallel to the arm, and second pivot means securing the pen arm to the block for pivotal movement relative to an axis perpendicular to the arm, situated forwardly of said first pivot means. There are means associated with the block and pen arm, forwardly and rearwardly of the first pivot means, for yieldably holding the pen arm parallel to the block and hence to the chart, and means associated with the block and pen at opposite sides of the second pivot means for adjustably positioning the longitudinal axis of the pen arm relative to the longitudinal axis of the block and hence of the supporting shaft. The means for adjusting the flexible element relative to the rigid arm is an adjusting screw threaded through the arm into engagement with the flexible element and the means for adjusting the position of the pen arm relative to the block is an adjusting screw secured to the block with an end engaged with a boss secured to the pen arm.

The invention will now be described in greater detail with reference to the accompanying drawings wherein.

Figure 1:
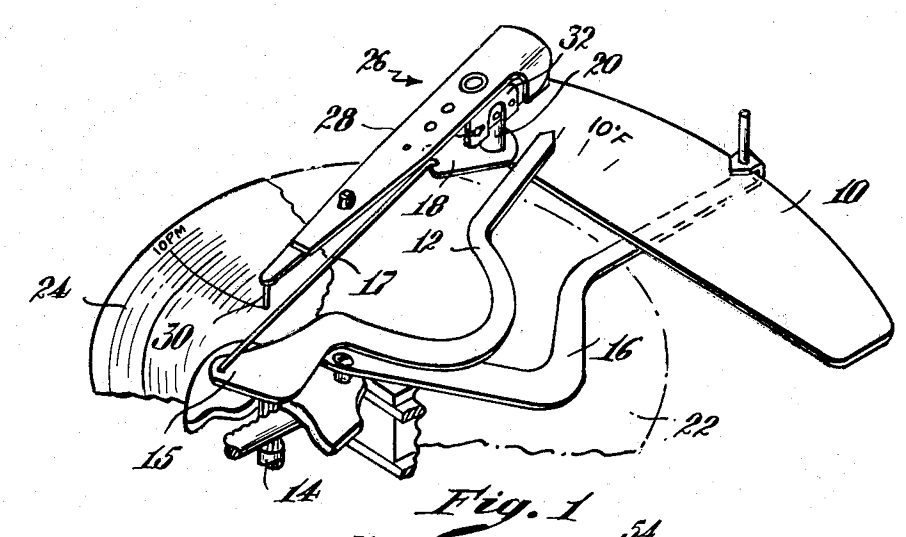
FIG. 1 is a fragmentary perspective of a recording instrument, showing the pen arm supported at one end substantially parallel to the surface of a chart for movement of a stylus fixed to its opposite end on the surface of the chart.
Figure 2:
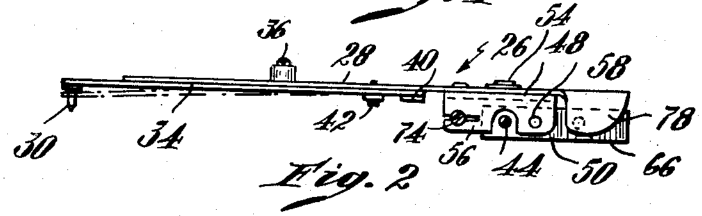
FIG. 2 is a side elevation of the pen and stylus assembly removed from the instrument.
Figure 3:
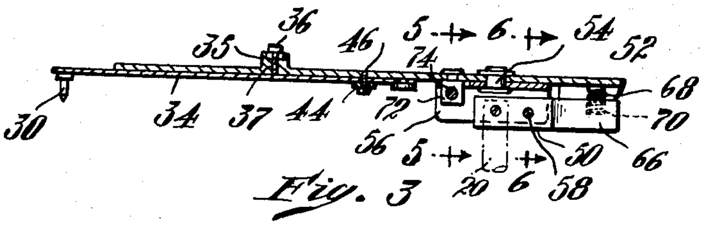
FIG. 3 is a longitudinal section of the assembly.

Referring to the drawings (FIG. 1), there is shown a scale 10 and a pointer 12 secured at its proximal end to a disc (not shown) which, in turn, is secured to a shaft 14, rotation of which is effected by a change in the ambient condition being measured. The pointer 12 is adjustably secured to the disc in the manner disclosed in the Leupold application referred to above, and adjustment is effected after the loosening of certain screws (not shown) which secure the pointer 12 to the disc, as shown in that application, by means of an adjusting arm 16.

The pointer 12 has one end of a link 17 connected to an arm 15 extending from its proximal end. The other end of the link 17 is connected to an arm 18 fixed to a shaft 20 rotatably supported with its axis perpendicular to the plane of a support 22, for holding a chart 24 below and parallel to the pointer and adjusting arms 12 and 16 respectively. A scribing assembly 26, comprising a pen arm 28, a stylus 30 and mounting means 32, is supported by the upper end of the shaft 20 with the pen arm 28 substantially parallel to the support 22 and with the stylus 30 engaged with the chart 24 on the support 22 for movement according to the dictate of the pointer 12 to record on the chart 24 a history of the movement of the pointer 12 along the scale 10.

For uses where there is considerable vibrations and where the ambient temperatures are extreme, a marking device in the form of a stylus which makes its mark by pressure against the surface of the chart is preferred to a fluid marking device, and it is the principal object of this invention to provide an improved mounting for a stylus of this kind which will enable adjustment of the marking pressure with accuracy between predetermined lower and upper limits which will afford adjustment for the pen arm relative to the chart to establish a zero position, and which will permit the pen arm to be lifted away from the chart sufficiently to facilitate replacement of successive charts.

The pen arm 28 is yieldably held in a position parallel to the surface of the support 22 so as to resist displacement away from the surface of the chart up to a predetermined maximum. The stylus 30 is yieldably supported on the pen arm 28 by a flexible element 34 and there is an adjusting screw 36 on the pen arm operative, by engagement with the flexible element 34, to displace the element 34 downwardly relative to the pen arm, operative to increase the pressure of the stylus against the chart from a predetermined minimum when the flexible element is held in contact with the pen arm to a predetermined maximum which is limited by the resistance of the pen arm 28 to displacement.

Figure 4:
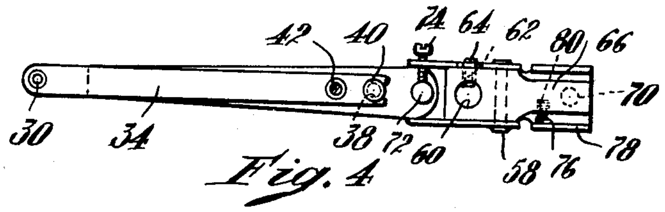
FIG. 4 is a plan view as seen from the underside of FIG. 2.
Figure 5:
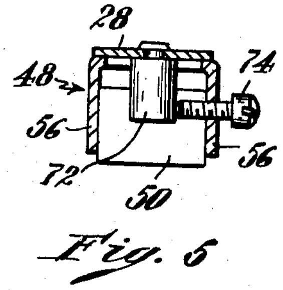
FIG. 5 is a transverse section taken on the line 5—5 of FIG. 3.
Figure 6:
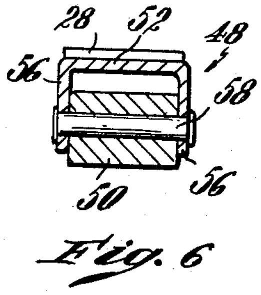
FIG. 6 is a transverse section taken on the line 6—6 of FIG. 3.

The flexible element 34 is secured at one end to the underside of the pen arm 28 with its other end projecting beyond the distal end of the pen arm 28 and it is to this projecting end that the stylus 30 is fixed. The end of the flexible element secured to the pen arm is provided with a notch 38 (FIG. 4) for engagement with a downwardly projecting boss 40 secured to the arm and by a screw bolt 42 inserted through a hole 44 in the flexible element and screwed into a threaded opening 46 in the pen arm. The pen arm has a boss 35 on it containing a threaded hole 37 perpendicular to the arm through which the adjusting screw 36 is threaded, so that its lower end engages the flexible element 34 and so that, by rotation of the screw, the flexible element may be displaced downwardly relative to the pen arm 28.

The mounting means for the pen arm 28 and stylus 30 comprises a channel element 48 on the pen arm and a block 50 on the shaft 20. The channel element 48 is secured at its back 52 to the pen arm 28, rearwardly of the flexible element 34, by a rivet 54 or the like, so that it is rotatable relative to the arm about an axis perpendicular thereto. The channel has spaced parallel flanges 56—56, parallel to the longitudinal axis of the pen arm, within which the block 50 is pivotally supported on a pin 58 fixed at its ends in the flanges 56, with its axis parallel to the pen arm 28, the pin 58 being located rearwardly of the rivet 54. The block 50 contains a vertically disposed hole 60 substantially vertically below the axis of the rivet 54 for receiving the upper end of the shaft 20 and a transverse threaded hole 62 for receiving a set screw 64 by means of which the block is fixed to the shaft 20.

The block 50 has a rearwardly extending tail end 66 of reduced cross-section and a coiled spring 68 is disposed between the tail end 66 and the rear end of the pen arm 28 with its lower end seated in a recess 70 in the tail end which urges the pen arm in a counterclockwise direction relative to the pin 58. The end of the rivet 54 within the channel provides an abutment which, by engagement with the block, limits depression of the pen arm relative to the pin 58 to a position substantially parallel to the block and hence to the chart.

The spring 68 is designed to resist pivotal displacement of the pen arm 28 from the face of the chart 24 up to a maximum of 20 grams per square centimeter and when the pressure increases beyond that to yield. As thus arranged, by adjustment of the screw 36, the yieldable element 34 may be displaced relative to the pen arm 28 to press the stylus 30 against the chart, between a predetermined minimum pressure and a predetermined maximum, determined by the coiled spring 68. The minimum pressure may, of course, be a zero pressure or any pressure between zero and the upper limit. A very fine adjustment of pressure is possible by reason of this arrangement. Moreover, it is possible to obtain a wide range of pressure for different purposes by selecting a spring 68 of suitable resistance to compression and a flexible element 34 of a suitable degree of stiffness or flexibility as the case may be.

It is also desirable to adjust the pen arm 28 about the vertical axis of the rivet 54, which coincides with the vertical axis of the supporting shaft 20, to establish a true zero position of the stylus 30 on the chart. To this end a stud 72 is fixed to the underside of the pen arm 28 forwardly of the block 50, with its axis on the longitudinal center line thereof, and a screw bolt 74 is threaded through one of the flanges 56 into abutting engagement with a side of the stud 72. The screw bolt is held engaged with the stud by a spring 76 disposed between one of the ears of a pair of ears 78—78 at the rear end of the pen arm 28, which are parallel to the sides of the tail end 66 and a side of the tail end with an end seated in a recess 80 formed in the tail.

The foregoing construction provides a very compact scribing assembly which is sensitive, easily adjustable, unaffected by ambient conditions, and readily adapted to replace the conventional fluid-type of pen without substantial modification of the instrument.

It should be understood that the present disclosure is for the purpose of illustration only and that this invention includes all modifications and equivalents which fall within the scope of the appended claims.

We claim:

1. A scriber for marking a chart comprising a stiff pen arm, means at one end adapted to support said pen arm for arcuate movement parallel to the surface of the chart about an axis perpendicular thereto, a flexible element coinciding with the lower side of the arm with one end secured to the arm forwardly of the first means and the other end extending forwardly of the distal end of the arm, a stylus fixed to the forwardly extending portion of the flexible element so as to extend downwardly therefrom into engagement with the chart, said flexible element being unconnected to said arm from its point of attachment thereto at said one end throughout its length forwardly toward the stylus, and means associated with the arm and flexible element operative, on a portion of the flexible element intermediate its ends, to displace the unconnected portion of the flexible element downwardly relative to the arm.

2. A scriber for marking a chart comprising a rigid elongate arm, means at one end of said arm adapted to support the arm for arcuate movement relative to an axis perpendicular to the arm for movement of its other end in an arc parallel to the surface of the chart, an elongate flexible element secured at one end to the underside of the arm forwardly of the first means, said flexible element extending from its point of securement forwardly along the underside of the arm beyond the distal end thereof, a stylus secured to the underside of the flexible element adjacent its forward end, and an adjustable screw on said arm having an end engaged with the flexible element intermediate its ends, said screw being operative to depress the flexible element downwardly relative to the arm.

3. A scriber for marking a chart comprising a rigid elongate arm, means at one end of said arm adapted to support the arm for arcuate movement relative to an axis perpendicular to the arm for movement of its other end in an arc parallel to the surface of the chart, a boss secured to the underside of the arm forwardly of the first means, an elongate flexible element having a notch at one end engaged with the boss and containing an opening forwardly of the notch, a screw bolt extending through the opening into threaded engagement with the arm, securing the flexible element to the underside of the arm with the portion forwardly thereof unconnected to the arm and flexible downwardly therefrom throughout its unconnected length, said flexible element extending forwardly of the distal end of the arm, a stylus fixed to the portion of the flexible element extending beyond the distal end of the arm, a screw-threaded boss on the arm forwardly of the screw bolt, and an adjustable screw threaded through the boss into engagement with the flexible element, said adjustable screw being operative to displace the flexible element downwardly relative to the arm.

4. A scriber for marking a chart comprising a rigid arm, a stylus resiliently secured to one end of the arm, a block, means securing the opposite end of the arm to the block for pivotal movement toward and from the surface of the chart about a transverse axis parallel to the chart, said block containing a hole perpendicular to the arm for receiving a supporting shaft, an abutment situated between the arm and the block at one side of said transverse axis limiting movement of the arm in one direction relative to the block to a position perpendicular to the axis of said hole in the block, and yieldable means situated between the arm and the block at the other side of said transverse axis yieldably holding the arm in the position limited by said abutment.

5. A scriber for marking a chart comprising a rigid arm, a stylus resiliently secured to one end of the arm, a channel secured to the opposite end of the arm, said channel having downwardly extending, spaced parallel flanges parallel to the longitudinal axis of the arm, a block pivotally secured within the channel between the flanges for pivotal movement of the arm to depress the forward end of the arm relative to the block about an axis transverse to the arm and parallel to the chart, an abutment on the arm operative, by engagement with the block, to limit depression of the arm to a position substantially parallel to the block, and a spring situated between the block and arm operative to hold the abutment on the arm against the block, said block containing a hole perpendicular to the arm for receiving a supporting shaft.

6. A scriber for marking a chart comprising a rigid arm, a stylus resiliently secured to one end of the arm, a channel, first means pivotally securing the opposite end of the arm to the back of the channel so that its flanges extend downwardly therefrom and parallel to the longitudinal axis of the arm for pivotal movement of the arm about an axis perpendicular to the arm, a block, second means pivotally securing the block within the channel between the flanges for pivotal movement about an axis located rearwardly of the first means and parallel to the chart, an abutment situated between the channel and block forwardly of the second means operative, by engagement with the block, to limit depression of the arm about said parallel axis, yieldable means situated between the arm and block rearwardly of said second means operative to hold the abutment engaged with the block, a boss fixed to the pen arm forwardly of the first means, an adjusting screw threaded through one of the flanges of the channel into engagement with said boss, and a spring disposed between the block and the other of said flanges, rearwardly of said second means, operative to hold the screw engaged with the boss.

7. A scriber for marking a chart comprising a rigid arm, supporting means to which the arm is attached for movement about an axis perpendicular to the chart and about an axis parallel to the chart, said supporting means being adapted to be secured to a supporting shaft rotatable about an axis perpendicular to the chart, means associated with the supporting means and arm yieldingly holding the arm in a position substantially parallel to the chart, said means resisting displacement of the arm away from the chart about the parallel axis until a predetermined pressure is exceeded, adjustable means associated with the supporting means and arm operable to adjust the longitudinal axis of the arm angularly on the supporting means about the perpendicular axis, an elongate flexible element secured at one end to the arm forwardly of the supporting means, said elongate flexible element extending forwardly beyond the distal end of the arm and having secured to its distal end a stylus, and means adjustably associated with the arm and an intermediate portion of the flexible element operable to displace the flexible element downwardly relative to the arm.

8. A scriber according to claim 7, wherein there is means for detachably securing the flexible element in alignment with the longitudinal axis of the arm, comprising fastening means intermediate the ends of the flexible element releasably supporting the flexible element on the arm, and locating means at the proximal end of the flexible element interengageable with means on the arm to align the longitudinal axis of the flexible element with the longitudinal axis of the arm.

References Cited by the Examiner

UNITED STATES PATENTS

| | | | |
|---|---|---|---|
| 689,529 | 12/01 | Wolfe | 346—140 |
| 1,136,648 | 4/15 | Bristol | 346—139 |
| 1,438,829 | 12/22 | Howell | 346—139 |
| 1,815,389 | 7/31 | Wolf | 346—132 |
| 2,066,262 | 12/36 | Finch | 178—5 |
| 2,203,057 | 6/40 | Moore | 74—470 |
| 2,292,119 | 8/42 | Hackenburg et al. | 346—139 |
| 2,677,589 | 5/54 | Johnsen | 346—139 |

LEYLAND M. MARTIN, *Primary Examiner.*